United States Patent

Cauquis

[15] 3,696,547
[45] Oct. 10, 1972

[54] FISHING LURE
[72] Inventor: Roger Daniel Cauquis, 25 rue de la Prairie, Aulnay Sous Bois, France
[22] Filed: Feb. 19, 1971
[21] Appl. No.: 116,830

[30] Foreign Application Priority Data
Feb. 19, 1970 France.....................7005958

[52] U.S. Cl. ...............43/42.39, 43/42.44, 43/42.52, 43/44.83, 43/44.86
[51] Int. Cl. .......................A01k 85/00, A01k 91/04
[58] Field of Search....43/42.39, 42.44, 42.52, 44.83, 43/44.86; 287/20.3, 103 D, 124

[56] References Cited

UNITED STATES PATENTS

| 2,291,422 | 7/1942 | Thomas................43/42.39 X |
| 2,796,695 | 6/1957 | Meulnart.................43/44.86 |
| 3,417,503 | 12/1968 | Meulnart..............43/42.39 X |

FOREIGN PATENTS OR APPLICATIONS

| 739,671 | 11/1955 | Great Britain............43/44.86 |
| 1,424,070 | 11/1965 | France......................43/42.52 |
| 92,564 | 10/1968 | France......................43/42.52 |

*Primary Examiner*—Samuel Koren
*Assistant Examiner*—Daniel J. Leach
*Attorney*—Edwin E. Greigg

[57] ABSTRACT

In a fishing lure there is provided a weight member which connects a fishhook to a wire link pivotally attached to the lure body. The weight member has a plurality of bores extending at right angles to one another. One bore contains the end portion of the wire link, at least one bore receives a flattened, laterally expanding portion of said wire link for anchoring the latter to the weight member and one bore serves for the introduction of a punch causing a localized flattening of said wire link.

4 Claims, 6 Drawing Figures

FISHING LURE

This invention relates to a fishing lure which is particularly adapted to catch carnivorous fish and which is of the non-rotating spoon-type.

It is known — as disclosed, for example, in French Pat. No. 1,424,070 — to provide a fishing lure which comprises, on the one hand, a body formed by a main concave vane or spoon of ovoid form having a punched-out, integral secondary vane which is disposed in the same plane of symmetry as the main vane and which is divergent with respect to the fishing line and, on the other hand, a multiple fishhook connected in an articulated manner to one end of a rigid, straight wire link which passes through the punched opening in the main vane and is attached thereto by its other end so as to be pivotable about an axis located at the frontal part of the secondary vane in the symmetric plane of the body. In fishing lures of this type, between the end of the fishing line and the lure body there is interposed a dynamic weight which functions as a head.

The new, very thin and very resistant fishing lines permit the omission of the weight, particularly for shallow water fishing. By omitting the aforenoted component, one point of articulation of the lure also disappears and it thus becomes necessary that the connection between the line and the body be extremely "mobile" in order to modify as little as possible the swim of the lure. It is further necessary to counteract the effect of the omission of weight on the equilibrium of the lure assembly.

Accordingly, the present invention provides an improved fishing lure having a hook and a body structure of the aforenoted type and a member which is interposed between the hook and the wire link and which serves as a weight and as an articulating connection between the hook and the wire link. The said member further includes simplified means for securely and rigidly anchoring one end of the wire lines to said member.

The invention will be better understood as well as objects and advantages of the invention will become more apparent from the ensuing specification of several exemplary embodiments taken in conjunction with the drawing wherein.

Figure 1:
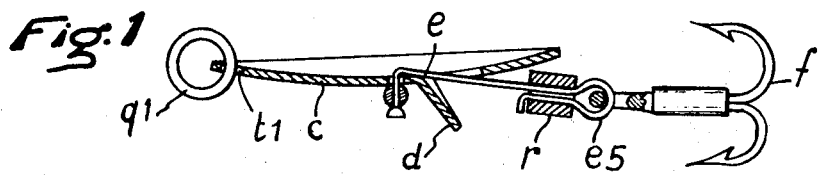
FIG. 1 is a longitudinal sectional view of a fishing lure according to the invention.
Figure 2:
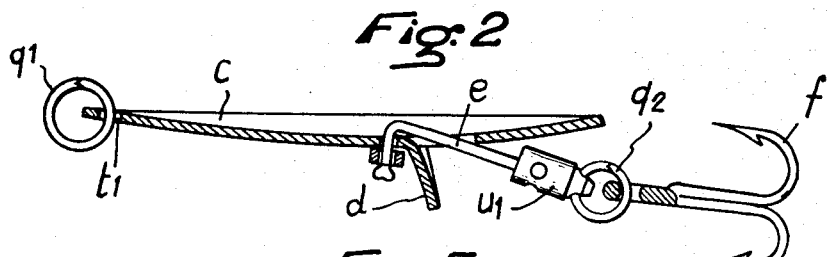
FIG. 2 is a longitudinal sectional view of another embodiment of the invention.

Turning now to FIGS. 1 and 2 there is shown a fishing lure which comprises a body $c$ formed of a main concave ovoid vane which is arched longitudinally and transversely and which has an integral tab punched out from the body $c$ and constituting a secondary vane $d$. The latter is arched transversely and is forwardly concave. There is further provided a multiple hook $f$ attached to one terminus of a rigid wire line $e$ which, in turn, is held on the body $c$ by its opposite terminus so as to be pivotable about an axis located in the symmetry plane of the lure body. In said symmetry plane and in the vicinity of that end of body $c$ which is remote from the hook $f$, the body $c$ is pierced to define a hole $t1$ in which there is engaged a split ring $g1$ for receiving the end of a fishing line not shown.

Turning now to FIG. 1, the articulation between the hook $f$ and the wire link $e$ is effected by causing the terminal loop $e5$, forming an integral part of wire link $e$, to pass through the eyelet of the hook $f$. The loop $e5$ is closed by a metallic sleeve $r$ which clamps together the legs of loop $e5$. The sleeve $r$ contributes to the equilibrium of the lure and, at the same time, permits sifficient freedom of motion thereof. The selection of the mass of the sleeve $r$ is dependent upon the mass of the lure.

Turning now to FIGS. 2, 3, 4 and 5, the balancing function of the lure is performed by a weight member $u1$, formed of a cylindrical main portion $V1$, a cylindrical extension $V2$ of reduced diameter and a frustoconical terminal portion $V3$. These three components are in axial alignment and form the rigid, unitary member $u1$.

The main portion $V1$ of the weight member $u1$ is provided with an axial blind bore $t2$ open towards that end face of main portion $V1$ which is remote from the extension $V2$. The bore $t2$ is adapted to receive an end portion of the wire link $e$. The main portion $V1$ is further provided with a throughgoing anchoring bore $t3$ which is normal to the longitudinal axis of weight member $u1$ and which communicates with the bore $t2$ by intersecting the same. Bores $t2$ and $t3$ are of substantially equal diameter. The main portion $V1$ is also provided with an access bore $t4$ which merges into the axial bore $t2$ and the axis of which intersects and is normal to the axis of both bores $t2$ and $t3$. The diameter bore $t4$ is preferably greater than that of bores $t2$ and $t3$.

Figure 5:
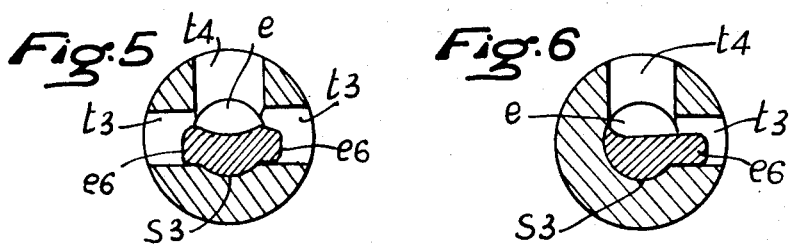
FIG. 5 is a sectional view along line V—V of FIG. 3.

For anchoring the end of the wire link $e$ to the weight member $u1$, after introduction of the terminal portion of wire link $e$ *light into the axial bore* $t2$ substantially as far as possible, the portion of wire link $e$ extending across bores $t3$ and $t4$ is flattened, thus producing lug portions $e6$, which expand into bore $t3$, locking wire link $e$ into weight member $u1$ (FIG. 5). This is effected by imparting a hammer blow on a punch or similar tool temporarily inserted for this purpose into the access bore $t4$. In this manner, the weight member $u1$ is held captive at the end of the wire link $e$ and is prevented from rotating with respect to the latter.

The cylindrical extension $V2$ and the base of the frustoconical terminal portion $V3$ are traversed by a throughgoing bore $t5$ which has an axis extending parallel to that of the bore $t4$. The bore $t5$ serves to receive a split ring $g2$ which, in turn, is held by the eyelet of the fishing hook $f$. The frustoconical configuration of the terminal portion $V3$ permits a reduction of the distance between points $s1$ and $s2$ where the ring $q2$ contacts the weight member $u1$. In this manner, the diameter of ring $q2$ may also be reduced.

Figure 3:
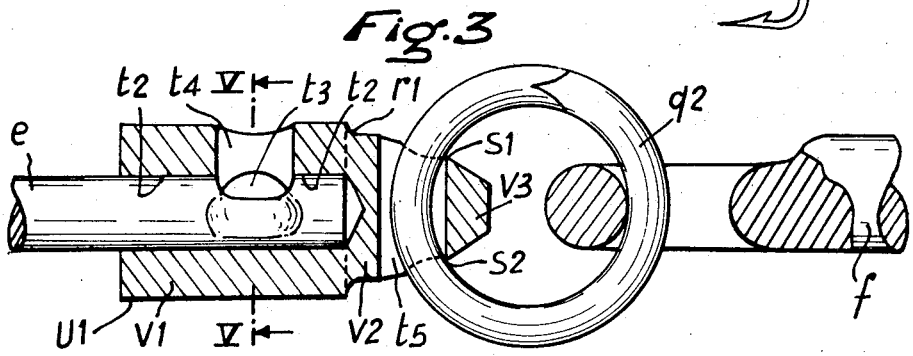
FIG. 3 is a side elevational sectional view of one part of the fishing lure shown in FIG. 2.
Figure 4:
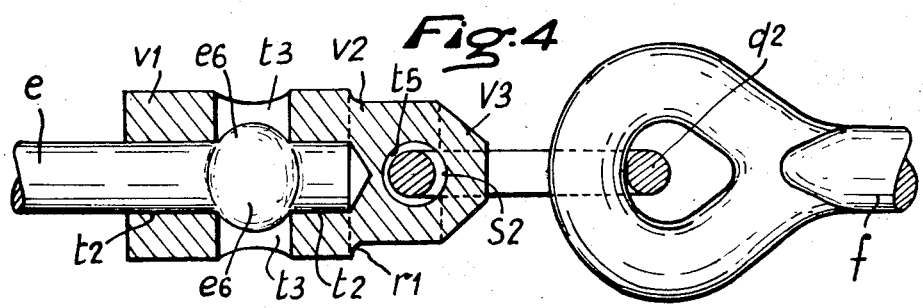
FIG. 4 is a sectional top plan view of the part shown in FIG. 3.
Figure 6:
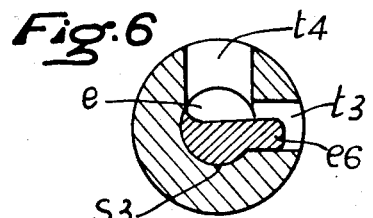
FIG. 6 is a view similar to that of FIG. 5 of a modified structure of a member forming part of the invention.

The weight member depicted in FIG. 6 differs from that shown in FIGS. 3–5 only in that the anchoring bore $t3$ is not throughgoing, but terminates upon merging into bores $t2$ and $t4$. Accordingly, upon flattening the portion of wire link $e$ exposed in bore $t4$, only one laterally extending lug $e6$ is formed.

What is claimed is:

1. In a fishing lure of the type that includes (a) a fishhook having attachment means, (b) a spoon-type vane and (c) a wire link pivotally secured to said vane at one end and associated with said fishhook at the other end, the improvement comprising a weight member having
   A. a main portion having a longitudinal axis and containing
      1. an axial bore receiving an end portion of said wire link remote from said vane,
      2. an anchoring bore extending normal to said axial bore and communicating therewith,
      3. an access bore extending normal to and communicating with both said axial bore and said anchoring bore; said access bore adapted to receive a tool for flattening a portion of said wire link and causing the flattened portions to expand into said anchoring bore,
   B. an extension projecting from said main portion in axial alignment therewith and
   C. a frustoconical terminal portion projecting from said extension in axial alignment therewith and containing, jointly with said extension, a throughgoing bore receiving said attachment means of said fishhook.

2. An improvement as defined in claim 1, wherein said anchoring bore is throughgoing and intersects said axial bore.

3. An improvement as defined in claim 1, wherein said anchoring bore extends solely in one direction from said axial bore.

4. An improvement as defined in claim 1, wherein said throughgoing bore extends parallel with said access bore.

* * * * *